United States Patent [19]
Tsuge

[11] Patent Number: 5,995,709
[45] Date of Patent: Nov. 30, 1999

[54] MPEG DECODER AND OPTICAL VIDEO DISC PLAYER USING THE SAME

[75] Inventor: Kenji Tsuge, Machida, Japan

[73] Assignee: Victor Company of Japan, Ltd., Yokohama, Japan

[21] Appl. No.: 08/806,415

[22] Filed: Feb. 26, 1997

[51] Int. Cl.[6] .................................................... H04N 5/91
[52] U.S. Cl. ............................................ 386/95; 348/589
[58] Field of Search ................................. 386/95, 46–52, 386/4, 83, 92; 348/468, 589, 600; H04N 5/91

[56] References Cited

U.S. PATENT DOCUMENTS

| | | | |
|---|---|---|---|
| 5,510,849 | 4/1996 | Han | 386/95 |
| 5,717,461 | 2/1998 | Hoogenboom | 348/394 |
| 5,729,651 | 3/1998 | Matsumoto | 386/95 |
| 5,790,744 | 8/1998 | Park | 386/95 |

Primary Examiner—Robert Chevalier
Attorney, Agent, or Firm—Micheal M. Meller; Eugene Lieberstein

[57] ABSTRACT

A system for inserting text data (e.g., closed caption data) contained In a user data or image data of an MPEG stream into the scanning line H21 of the Image signal recovered from the MPEG stream through a simplified process. In case of text data in the user data, the image data is decoded compressed image data on the video-CD is expended and stored as video data in the first memory location, and the closed caption data in the user data area is NRZ-modulated and stored in the second memory location. The caption data is read out of the second memory location and output to a bit map pixel data channel during a period of H21 of the output video data stream, and the video data Is read out of the first memory location and output to an video pixel data channel in the periods after H22 of the output video data stream. Thus, the two data are multiplexed on a bus.

21 Claims, 15 Drawing Sheets

MPEG DECODER AND OPTICAL VIDEO DISC PLAYER USING THE SAME

BACKGROUND OF THE INVENTION

1. Field of the Invention

The present invention relates to an MPEG decoder which receives a data stream including MPEG-coded data which contains closed caption (CC) data in a user data area as character codes or in a picture data area as NRZ-converted pixel data and outputs at least an MPEG-decoded video data stream including the CC data such that a TV set with a text decoder can display the CC and its application to an optical disc player such a video-compact disc (video-CD) player, a digital video disc (DVD) player, etc.

2. Description of the Prior Art

A technique is well known for Inserting closed caption data in an undisplayed part of the video signal and for decoding the data into a text and superimposing the text over the displayed image. Specifically, in a system in which horizontal scanning lines H1 through H21 (H264 through H284) of all the horizontal scanning lines H1 through H525 are used as vertical blanking periods and H22 through H263 (H285 through H525) are used as video signals, the broadcast station inserts text codes as NRZ (non-return-to-zero)-modulated signals in one of the vertical blanking periods, e.g.. H21, and the TV receiver converts the NRZ-modulated signals into a text image by using an text decoder and superimposes the text image over the video image.

Similarly, there may be cases in which text information (closed caption data) is included in MPEG coded data to be transmitted or recorded on an optical disc (video-CD, DVD, etc.) in a transmission or recording of moving pictures, respectively. In such cases, a receiver or an optical disc player can insert the text information cointained in the MPEG coded data received from the transmission path or reproduced from the optical disc into the line H21 of a video signal obtained by MPEG decoding the MPEG coded data and output the video signal to the TV receiver. However, if this is to be done during the complicated process of MPEG data stream comprising I, P and B pictures, it will make the whole process more complicated.

SUMMARY OF THE INVENTION

It is therefore an object of the invention to provide a system and method, used in a MPEG decoder which receives a data stream including MPEG-coded data which contains closed caption (CC) data in a user data area as character codes (hereinafter, referred to as "in the user data mode") or in picture data as NRZ-converted pixel data (hereinafter, referred to as "in the MPEG mode") and at least outputting an MPEG-decoded video data stream, for inserting, making the whole process so complicated, the CC data in the scanning line H21 in such a form of NRZ-converted pixel data as a conventional character decoder of a television receiver can decode.

It is another object of the invention to provide a system for receiving a data stream including MPEG-coded data which contains CC data in the user data mode or in the MPEG mode and at least outputting an MPEG-decoded video data stream which contains the CC data in the scanning line H21 in such a form of NRZ-converted pixel data as a conventional character decoder of a television receiver can decode.

It is further object of the invention to provide an optical disc player capable of inserting CC data recorded in the user data mode or MPEG mode on an optical disc into the scanning line H21 of a video signal reproduced from the optical disc.

In a MPEG decoder which receives a data stream including MPEG-coded data which contains CC data and at least outputting an MPEG-decoded video data stream, the decoded video data stream is stored in the first memory area. If the CC data is in a user data mode, the CC data is NRZ-converted and stored in the second memory area. The CC data is read out of the second memory area and output to a bit map pixel data channel of an video output processor during a period of H21 in an output video data stream, and the stored video data is read out of the first memory area and output to a video pixel data channel of the video output processor in the periods beginning with H22 of the output video data stream. Thus, the two data are automatically multiplexed on the output data lines.

In case of CC data in an MPEG mode, the CC data, which has been included in the video data as NRZ-modulated. MPEG-decoded and stored the first memory area. The data stored for H22 in the first memory area is read out and output to the PCM pixel data channel of the video output processor during a period of H21 in the output video data stream, and the stored video data is read out and output to the PCM pixel data channel in the periods beginning with the line H22 of the output video data stream. Thus, the two data are automatically multiplexed on the output data lines.

However, in a system in which a video signal is interpolated in the vertical direction by every two adjacent horizontal scanning lines in the chrominance processing as is well known in the art, if the closed caption data is allocated to the first one of the horizontal scanning lines in a displayed area, then the closed caption data is interfered by the line just under the first line, resulting in a distraction of the caption data.

In order to cope with this problem, the vertical interpolation is applied only to the scanning line H22 and the following lines. Alternatively, the scanning lines H21 and H22 of the expanded image data is made monochrome before the expanded image data is stored, and then the vertical interpolation is applied only to the line H22 and the following lines.

BRIEF DESCRIPTION OF THE DRAWING

Further objects and advantages of the present invention will be apparent from the following description of the preferred embodiments of the invention as illustrated in the accompanying drawings. In the drawing.

DETAILED DESCRIPTION OF THE PREFERRED EMBODIMENTS

We will discuss a video-CD player as an example of application of an MPEG decoder of the invention to an optical disc In the following.

Figure 1:
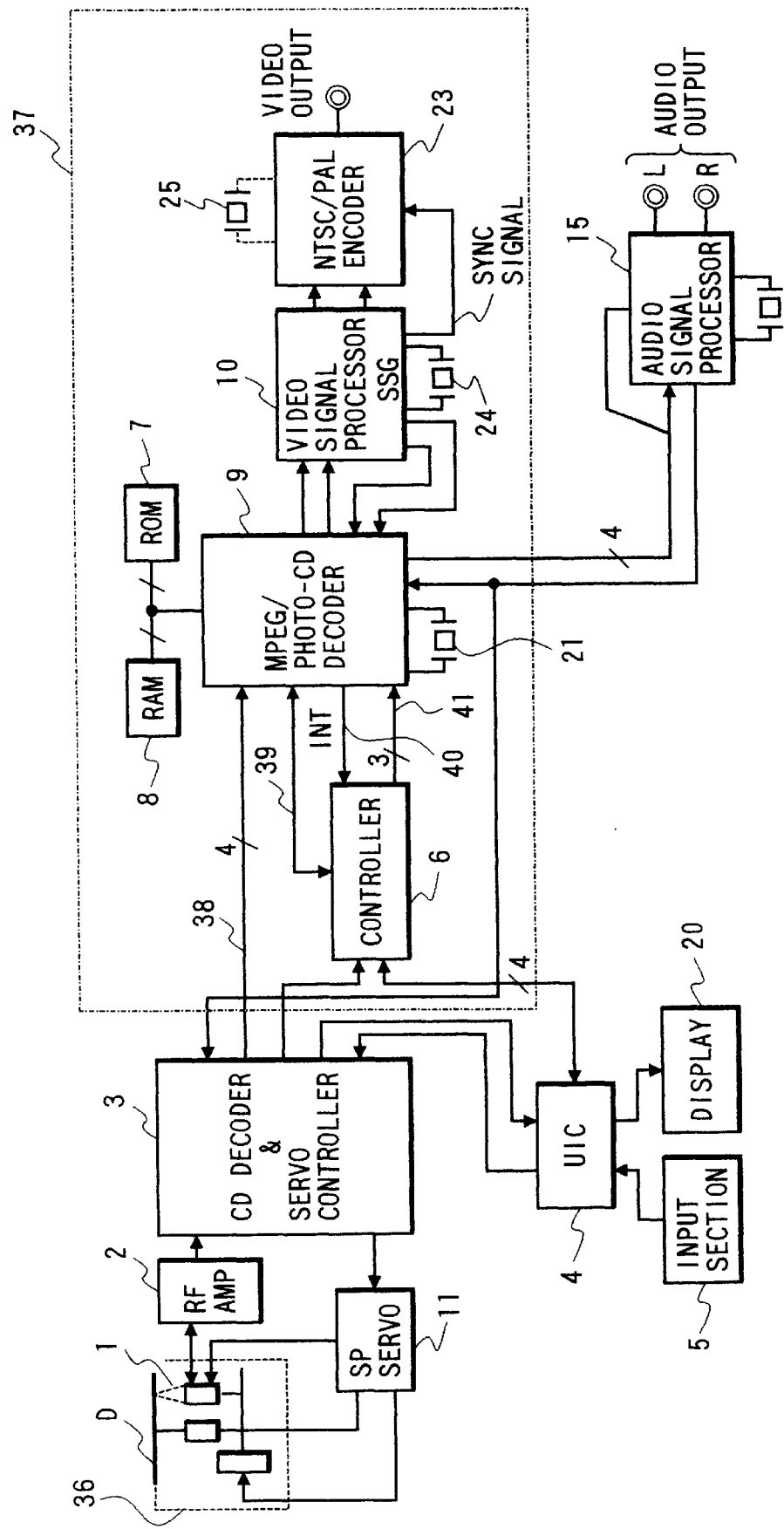
FIG. 1 is a block diagram showing an illustrative embodiment of a video-CD player according to the principles of the invention.

FIG. 1 is a block diagram showing an illustrative embodiment of a video-CD player according to the principles of the invention. The video-CD player is also capable of playing a CD exclusively used for music.

In FIG. 1, the video-CD player comprises a pickup 1 for reading out information, recorded on a video-CD to be played, as an EFMed signal; a mechanical section 36 for rotating the CD at a predetermined speed and for holding and positioning the pickup 1; an RF amplifier 2 for amplifying the EFMed signal; an SP servo controller 11 for controlling the rotations of a disc motor and a pickup motor and controlling the focus of the pickup 1; a CD decoder & servo controller 3 for demodulating the amplified EFMed signal and extracting SC and TOC data (in Sub-Code area and Table Of Contents area, respectively) in the demodulated signal while controlling the SP servo controller; an input section 5 having, for example, PLAY, STOP, FF, RF, DIGEST and JUMP buttons; a display 20 for displaying the operation mode, a system abnormality, etc; a UIC (user interface controller) 4 having a memory (not shown) for temporarily storing data passed from the CD decoder & servo controller 3 in a predetermined format; and an audio signal processor 15 for converting reproduced digital audio signal into an analog audio signal and de-emphasizing the analog audio signal. The UIC 4 receives the SC data and TOC data from the element 3 and sends instructions to the element 3 on the basis of the SC and TOC data and input data from the input section 5. The above-described elements constitute a circuit for playing a CD exclusively used for music. The video-CD player further comprises a video-CD circuit 37.

The video-CD circuit 37 comprises a controller 6, an MPEG/photo-CD decoder 9, a ROM (read only memory) 7 for storing a program for a CPU included in the circuit 37, a RAM (random access memory) 8 connected to the decoder 9, a video signal processor 10 including a sync signal generator (SSG), an NTSC/PAL encoder 23, and crystal resonators 21, 24 and 25. The controller 6 controls the whole system by controlling the UIC 4 and the MPEG/photo-CD decoder 9. The program for controlling the whole system is stored in a ROM (not shown) included in the controller 6. (The above-described controllers 4 and 6 each comprise a CPU, a ROM and a ROM, which are not shown.) The CD decoder & servo controller 3 sends compressed video-CD data to the MPEG/photo-CD decoder 9 via 4-bit data line 38. The MPEG/photo-CD decoder 9 decodes the compressed video-CD data into Image data necessary for displaying a frame of image and expands an audio signal.

The controller 6 and the decoder 9 are interconnected via a data bus 39. Through the data bus 39, mode information and control signals for controlling the decoder 9 are transmitted from the controller 6 to the decoder 9; status information indicative of the status of decoder 9 operation is transmitted to the controller 6; and address information for various data are transmitted bidirectionally between them.

The decoder 9 can send an interrupt request to the controller 9 via a line (INT) 40, requesting the controller 6 to send a series of data. Also, the controller 6 can send audio status data to the decoder 9 via data lines 41 of 3 bits for example.

The video signal processor 10 converts decoded digital audio signal from the decoder 9 into an analog audio signal, and converts EGB signals or luminance and color difference signals into a composite signal. The NTSC/PAL encoder 23 encodes the composite signal and outputs an NTSC or PAL signal to a TV receiver with a text decoder (not shown). The crystal resonator 21 resonates with the frequency of the clock for the decoder 9. The resonator 24 resonates with a frequency of 13.5 or 27 MHz suitable for operation of the video signal processor 10. The resonator 25 resonates with the frequency of chrominance subcarrier, i.e., 3.57945 (NTSC) or 4. 43361875 MHz (PAL) for the NTSC/PAL encoder 23.

Figure 2:
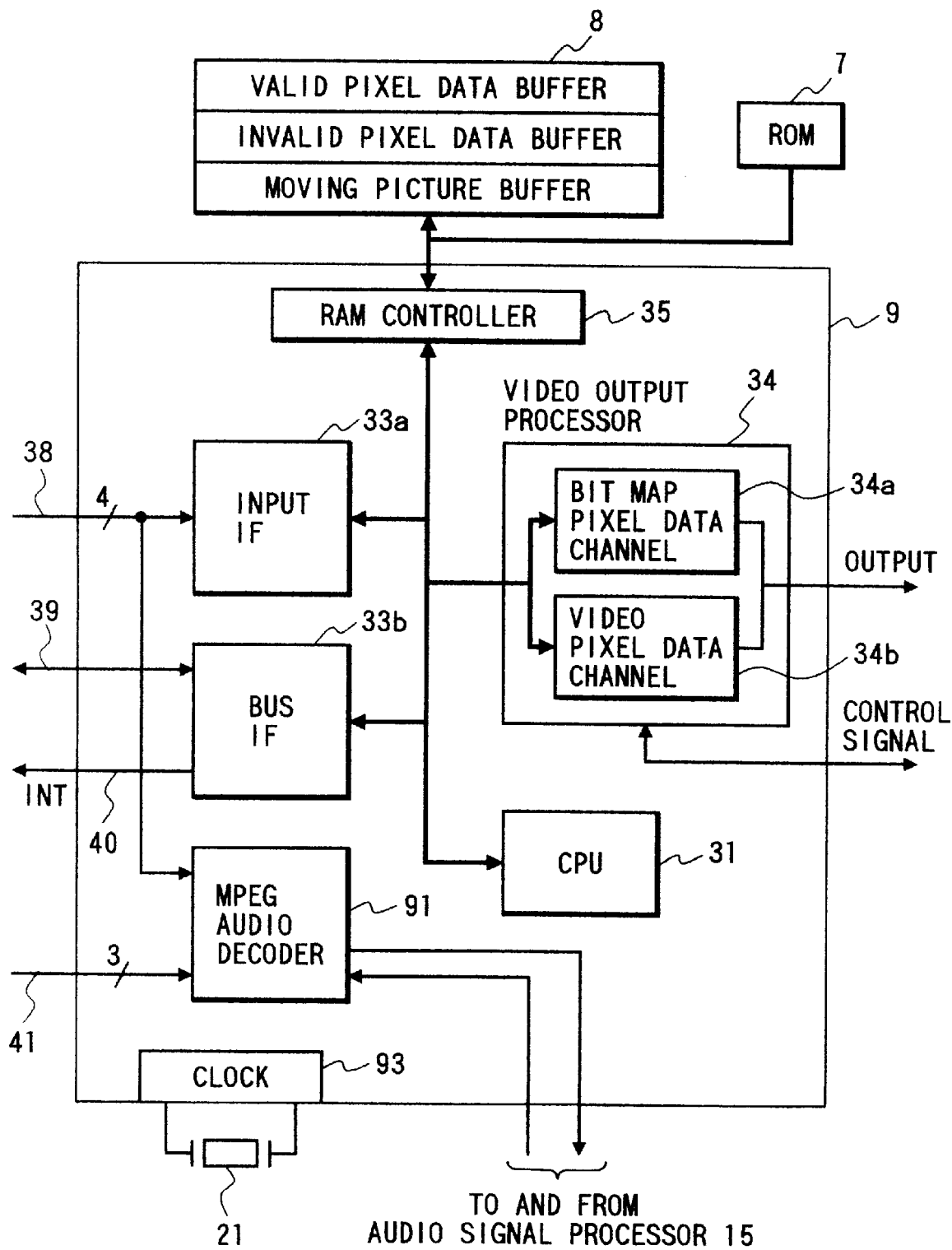
FIG. 2 shows, in a simplified block diagram, details of the MPEG/photo-CD decoder of FIG. 1.

FIG. 2 shows details of the MPEG/photo-CD decoder 9 of FIG. 1. The decoder 9 comprises an MPEG audio decoder 91 and an input interface (IF) 33a connected to the CD decoder & servo controller 3, a sync signal generator (SSG) 93 and a CPU 31. To the data bus of the CPU, there are connected the bus IF 33a, a bus IF 33b, a RAM controller 35 and a video display processor 34. The CPU 31 not only controls the interfacing elements 33 through 35 but also performs an interpretation of MPEG syntax, a 2D-IDCT (2-dimensional inverse discrete cosine transform), an inverse quantization, a calculation of motion vectors, etc. Thus, since the decoder 9 has to process a lot of data at a high speed, the CPU 31 is preferably a RISC (reduced instruction set computer) processor.

The Input IF 33a receives the compressed video-CD data stream from the element 3 and sets not shown internal registers of the decoder 9 as detailed later. The CPU 31 communicates with the controller 6 via the bus IF 33b. The video display processor 34 outputs decoded image data to the video signal processor 10. The RAM controller 35 controls a read and write of RAM 8.

The RAM 8 is used as rate buffers, a reference video memory, and a display memory. Also, the RAM 8 is preferably used as an instructing memory for the RISC 31 in order to raise the operation speed of the RISC. For this purpose, the program of the RISC stored in the ROM 7 is transferred to the RAM 8 in the initial procedure executed at the time of a power-on or a reset of the system. The RAM has at least have a valid and invalid pixel data buffer areas for each storing one horizontal scanning line of pixel data, and a moving picture buffer area for storing a frame of pixel data. The closed caption data read from the video-CD in a user data mode is decoded, converted into NRZed data and then stored in the valid pixel data buffer area. The invalid pixel data buffer area stores image data for the closed caption data in a user data mode if the closed caption data is valid. The invalid pixel data buffer area stores incoming data as invalid image data if the closed caption data is valid in a user data mode. A write and a read of the buffer areas are done in the FIFO manner. The moving picture buffer area stores the closed caption data and the moving picture data in case of an MPEG mode.

(If closed caption data is recorded in the form of characters in the User Data field of the Picture Layer on the video-CD, the CC data is said to be in a "user data mode." If CC data is recorded as a part of an image data on the video-CD, the CC data is in an "MPEG mode.")

It is noted that the RAM controller 35 reads data from the valid pixel data buffer if a user data active flag is 1 and, otherwise, from the invalid pixel data as detailed later. Then, the read data from the moving picture buffer is output to a video pixel data channel 34b in the video display processor 34, and the read data from the valid or invalid pixel data buffer is output to a bit map pixel data channel 34a (for the NRZ caption data) in the video output processor 34, causing these data to be compounded on a data bus.

The RAM 8 Is 16 bits in the data width. MPEG1 requires less than 1/6 of processing volume and less than 1/4 of memory width as compared with MPEG2. The actual pixel rate is about 3.3 MHz in case of SIF (Source Input Format), that is, 352×240 pixels (30 frames per sec). Almost all of the decoding process can be done through sequential processing by a RISC operating at 40 MHz.

Since the video-CD uses MPEG1 format, the image data recorded on a video-CD includes the same structure as that of MPEG1, that is, a hierarchical structure comprising 6 layers ... Sequence Layer, GOP (Group Of Pictures) Layer, Picture Layer, Slice Layer, Macroblock Layer, and Block Layer, if cited from the top. The present invention relates to processing of the lower layers beginning with the Picture layer.

After processing the data in the Sequence Layer and the GOP layer, the CPU 31 processes the following data hierarchically arranged in the Picture Layer and then the slice Layer.

PSC (Picture Start Code)

TR (Temporal Reference)

PCT (Picture Coding Type)

VD (Video Buffering Verifier Delay)

FPFV (Full Pel Forward Vector)

FFC (Forward F Code)

FPBV (Full Pel Backward Vector)

BFC (Backward F Code)

EBP (Extra Bit Picture)

EPI (Extra Information Picture)

ESC (Extention Start Code)

PED (Picture Extention Data)

UDSC (User Data Start Code)

UD (User Data)

Figure 3:
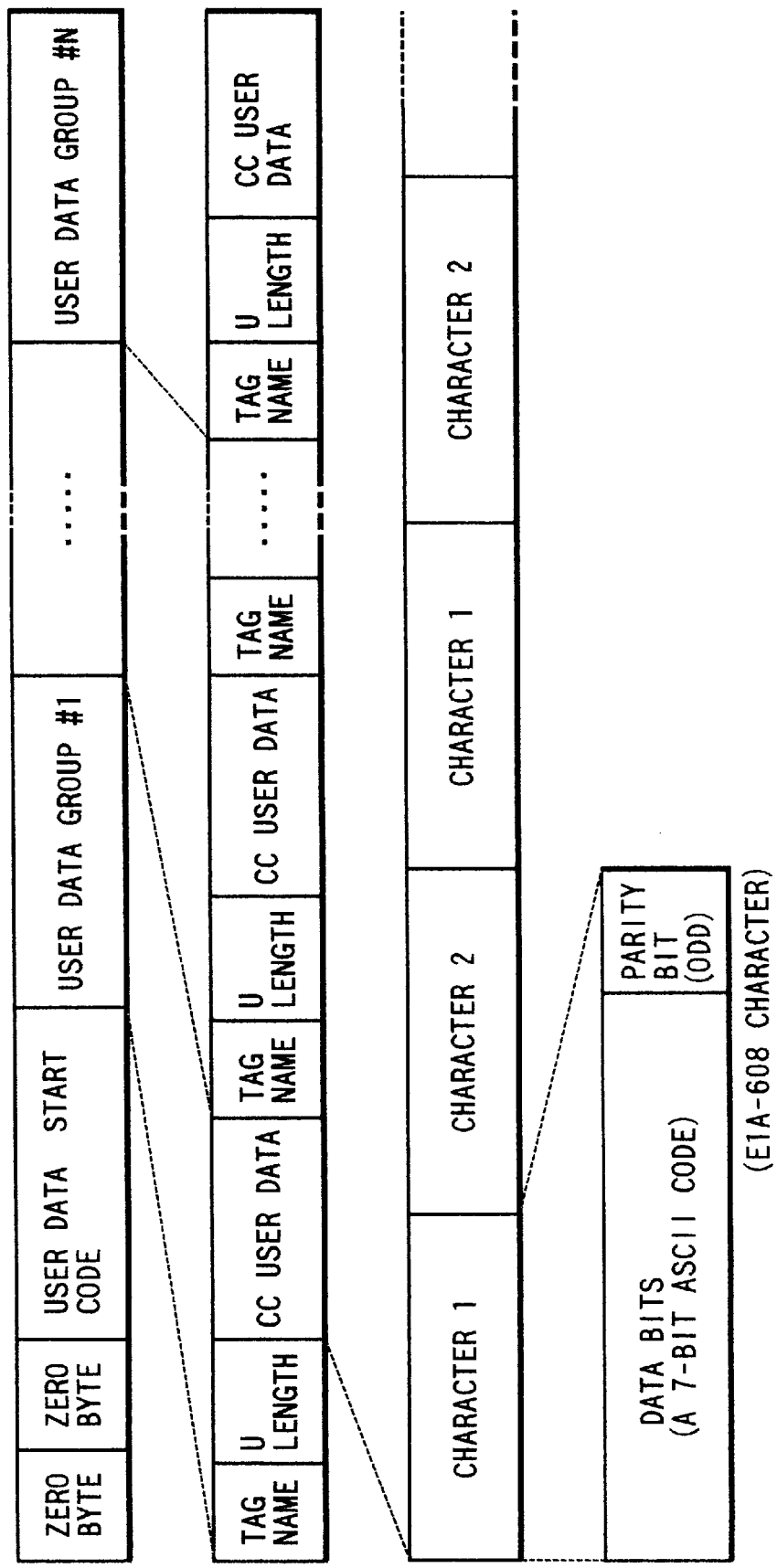
FIG. 3 illustrates the format of closed caption (CC) user data of the video-CD.

FIG. 3 illustrates the format of closed caption (CC) user data of the video-CD (defined in chapter VII.4). In FIG. 3, CC user data comprises 2 fields of 0s, a field of UDSC (User Data Start Code), and N fields of User Data Groups. The data length of each field is shown in Table 1.

TABLE 1

(General Structure of User Data)

| Field Name | Value | Size (byte) |
|---|---|---|
| Zero Byte | 0 × 00 | 1 |
| Zero Byte | 0 × 00 | 1 |
| User Data Start Code | 0 × 000001B2 | 4 |
| User Data Group #1 | | Variable |

Each of the User Data Groups with CC data comprises a single-byte Tag Name field, a single-byte U Length field (byte), a CC User Data field of (U Length-2) bytes. The value of the Tag Name is "0×11", which means that the CC User Data field contains closed caption user data. Each CC User Data field contains a pair of EIA-608 characters. Each EIA-608 character consists of 7 data bits (ASCII code) and a single-bit parity bit (odd parity).

If the value of the Tag Name is 0×10, it means that CC User Data field contains scan information data.

Referring now to FIGS. 4 through 13 and 15, we discuss operation of converting the text information recorded in a user or PMEG data area on the video-CD into an NRZ-modulated signal and inserting the signal into the scanning line H21 of the image signal reproduced from compressed image data on the video-CD through a simplified process in a video-CD player in accordance with the principles of the invention in the following.

Figure 4:
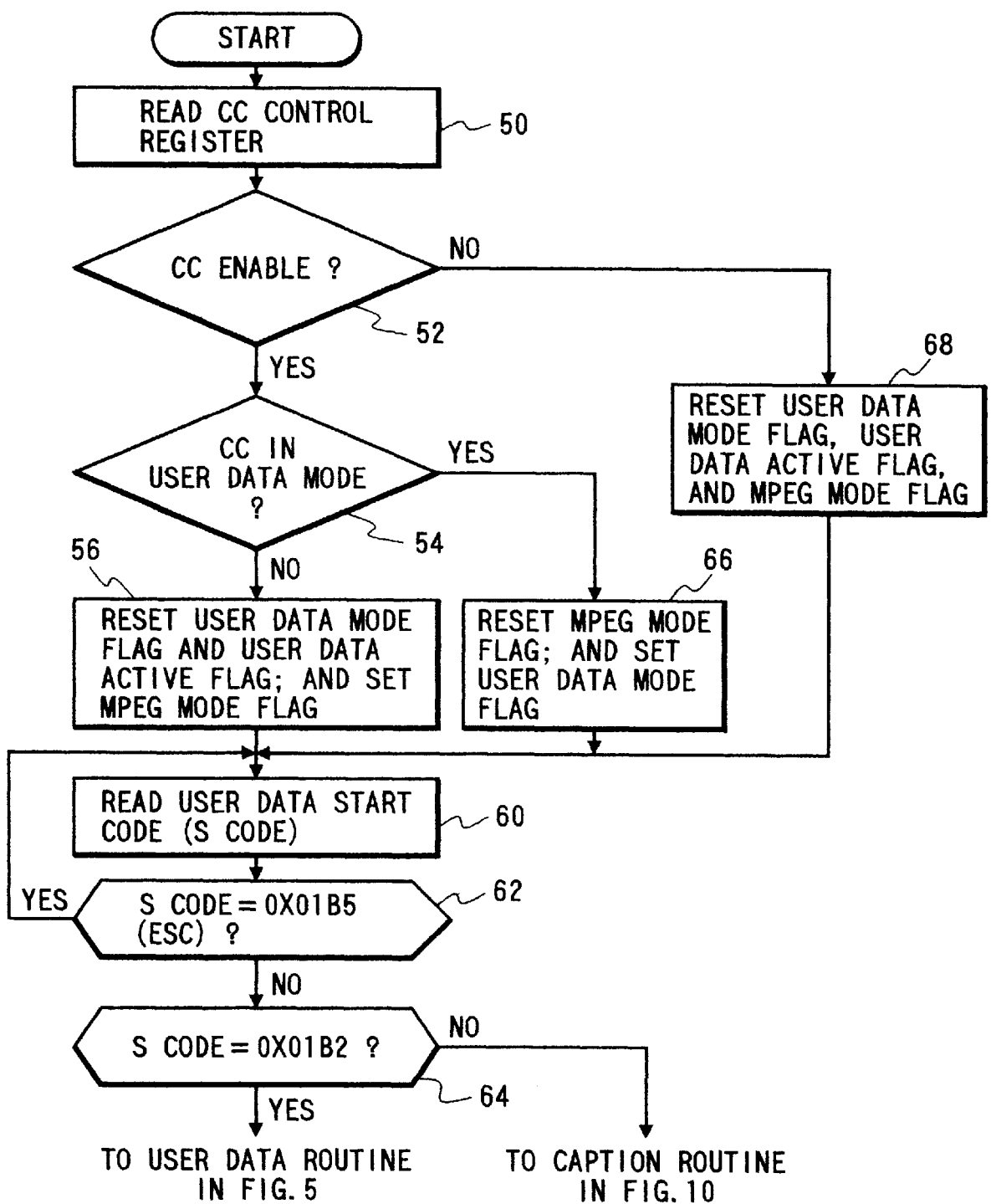
FIG. 4 is a flow chart showing the first routine of a main program in accordance with the illustrative embodiment.

Specifically, FIGS. 4. 5 and 10 constitutes a main program executed by the CPU 31 of the MPEG/photo-CD decoder 9. After completing a necessary process of above described data of the Picture Layer, e.g., up to the PED (Picture Extension Data), the CPU 31 enters the first routine of the main program. In step 50, the CPU 31 reads CC control register to see if the CC is enable in step 52. If not, the CPU 31 proceeds to step 68 to reset (make 0) a user data mode flag (UDME), a user data active flag (UDAF) and an MPEG mode flag (MPEGMF).

If the closed caption is enable in decision step 52, the CPU 31 proceeds to step 54, where a test is made to see if the closed caption is in the user mode. If so, the MPEGMF is reset, and the UDMF Is set in step 66. Otherwise (in case of the MPEG mode), the CPU 31 resets the UDMF and the UDAF and sets the MPEGMF in step 56. After completing any of steps 56, 68 and 68, the CPU 31 proceeds to step 60, where the User Data Start Code (S code) is read to see if the S code =0×0b5 (ESC (Extension Start Code) in step 62. If so, the CPU 31 returns to step 60, and otherwise make a test to see if the S code is 0×01b2 in step 64. if so, the CPU 31 proceeds to a user data routine of FIG. 5, and otherwise proceeds to a caption routine of FIG. 10.

Figure 5:
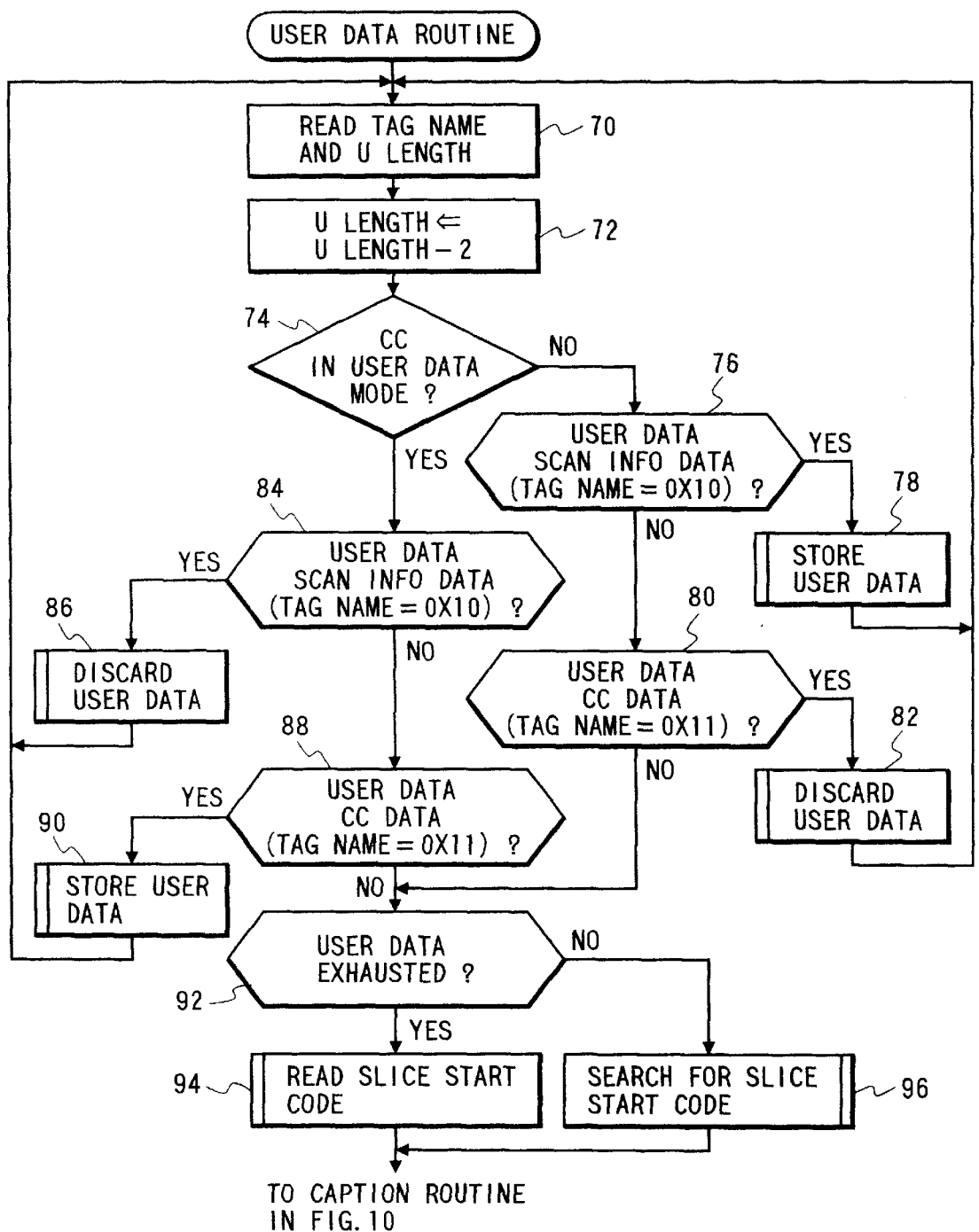
FIG. 5 is a flow chart showing the user data routine of FIG. 4 in detail.

In the user data routine of FIG. 5, the CPU 31 starts from step 70, where the CPU 31 reads the Tag Name and the U Length fields shown in FIG. 3. In step 72, the CPU 31 subtracts 2 from the U Length. A test is made in step 74 to see if the closed caption (CC) is in the user data mode. If not (in case of the MPEG mode), then a test is made in step 76 to see if the user data is scan information data, that is, Tag Name=0×10. If so, then in step 78 the CPU 31 stores the user data as detailed in a "STORE USER DATA" subroutine of FIG. 6. and returns to step 70. If the test result is NO In decision step 76, another test is made in step 80 to see if the user data is CC data, that is, if the Tag Name=0×10. If so, then in step 82 the CPU 31 discards the user data as detailed in a "DISCARD USER DATA" subroutine of FIG. 7. and returns to step 70.

If the test result is YES in decision step 74, then the CPU 31 proceeds to step 84, where another test is made to see if the user data is scan Information data, that is, if the Tag Name=0×10. If so, the CPU 31 calls the DISCARD USER DATA subroutine in step 86 and returns to step 70. If the test result is NO in decision step 84, then the CPU 31 proceeds to step 88, where further test is made to see if the user data is CC data, that is, if the Tag Name=0×11. If so, the CPU 31 calls the STORE USER DATA subroutine in step 90 and returns to step 70. If the test result is NO in decision step 88, then the CPU 31 proceeds to step 91, where a test is made to see if all the user data is processed (the Tag Name=0). If so, then in step 94 the CPU 31 reads Slice Start Code as detailed in a "READ SLICE START CODE" subroutine of FIG. 8, and proceeds to a caption routine of FIG. 10. Otherwise, the CPU 31 searches for Slice Start Code as detailed in a "SEARCH FOR SLICE START CODE" subroutine of FIG. 9, and again proceeds to a caption routine of FIG. 10.

Subroutines

FIGS. 6 through 9 are flow charts showing details of the subroutines STORE USER DATA, DISCARD USER DATA, READ SLICE START CODE, SEARCH FOR SLICE START CODE, respectively.

Figure 6:
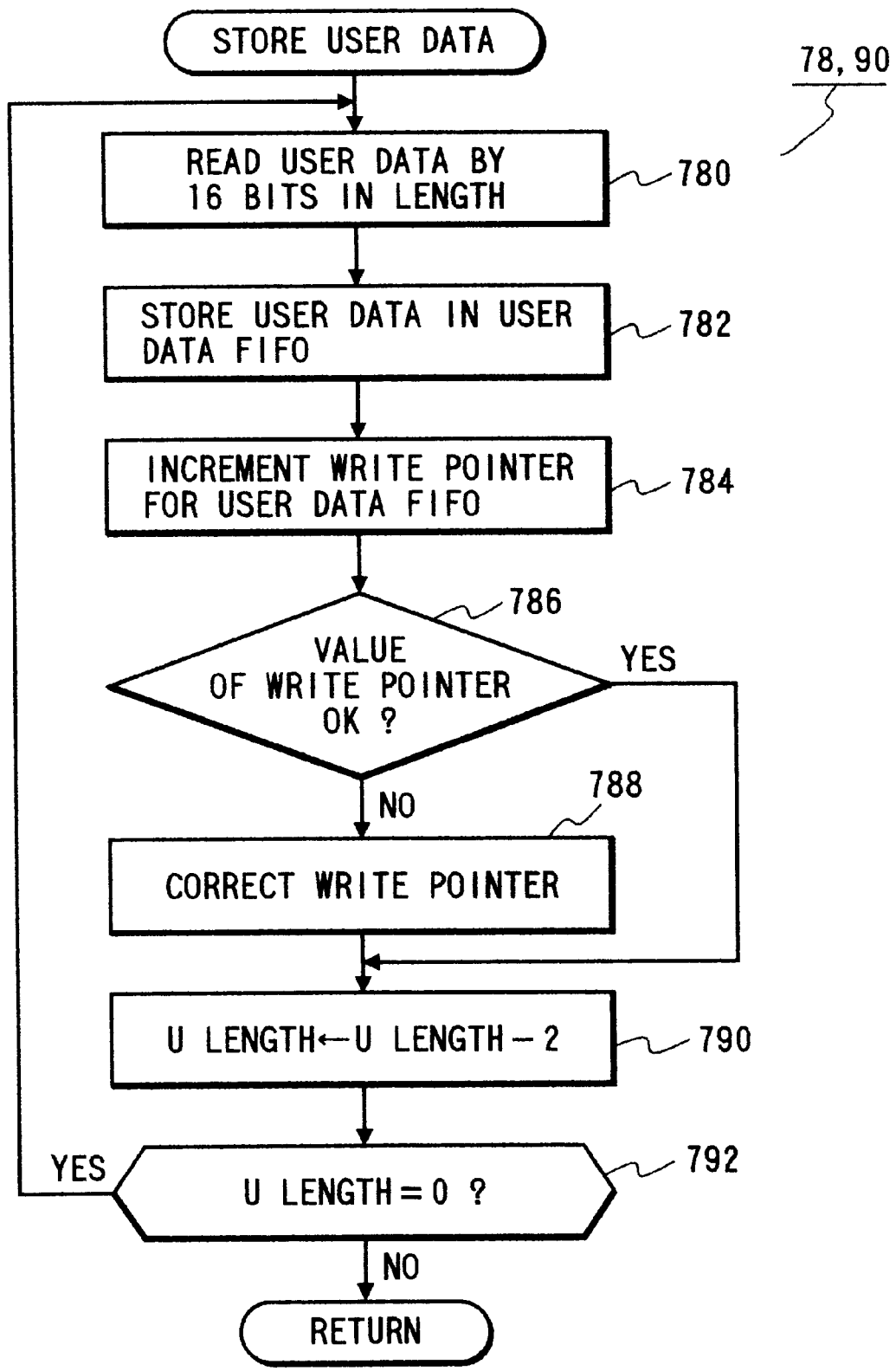
FIGS. 6 through 9 are flow charts showing details of the steps, respectively, in FIG. 5.

In FIG. 6, The CPU 31 reads, in a length of 16 bits, data in the CC User Data field in step 780, stores the read data in a user data FIFO area or pixel data buffer in step 782, and increments the value of a write pointer for the user data FIFO area in step 784. In step 786, a test is made to see if the write pointer value is correct. If not, the value is corrected in step 788. In either case, the value of the U Length field is decrement by 2 in step 790. The U Length value is checked to see if it is zero in step 792. If so, the CPU 31 goes back to step 780, and otherwise returns to step 70 of the USER DATA ROUTINE of FIG. 5.

Figure 7:
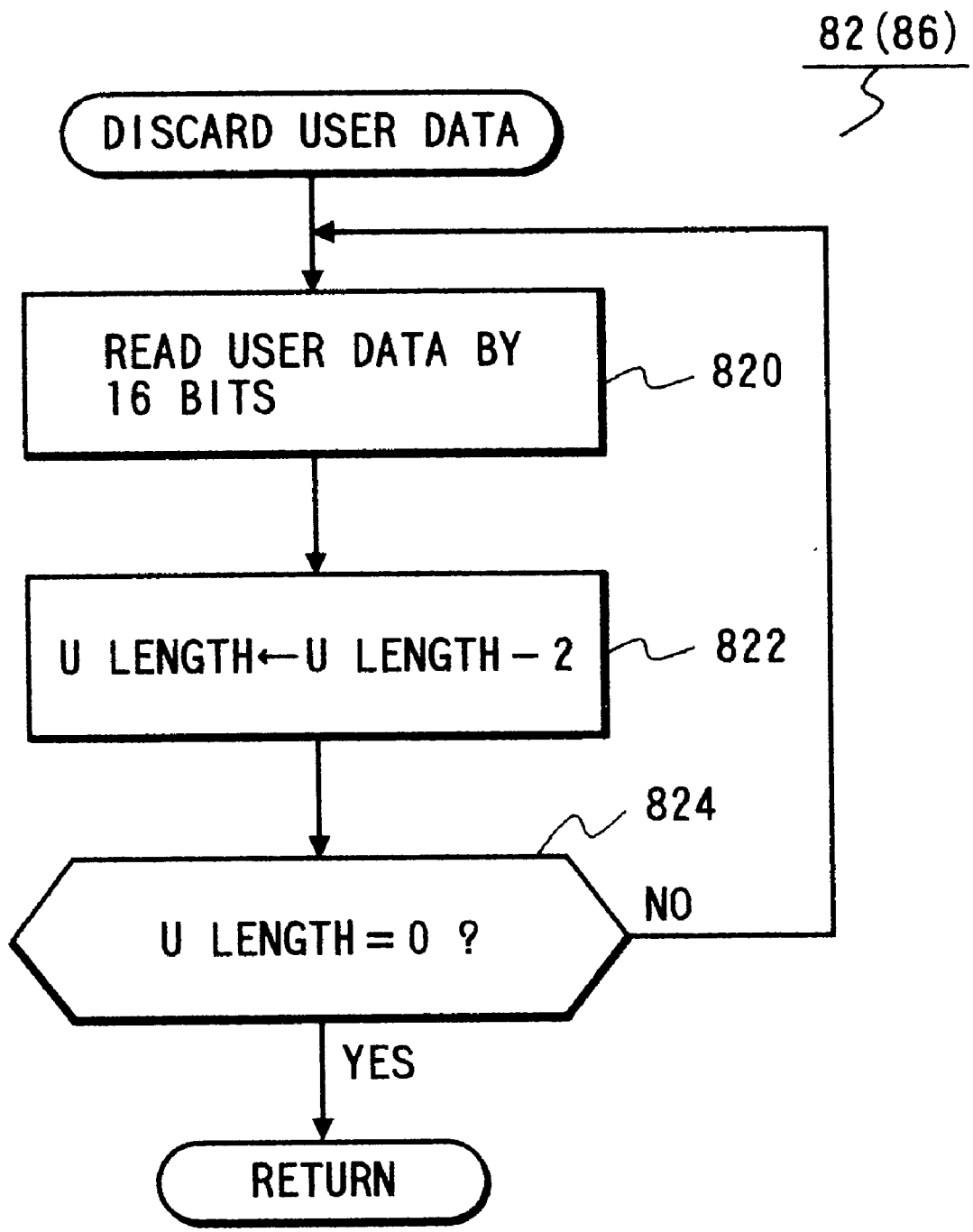

In the DISCARD USER DATA subroutine of FIG. 7, the CPU 31 reads, in a length of 16 bits, data in the CC User Data field in step 820, and subtract 2 from the value of the U Length field in step 822. The U Length value is checked to see if it is zero in step 824. If so, the CPU 31 returns to step 70 of the USER DATA ROUTINE of FIG. 5, and otherwise goes back to step 820.

Figure 8:
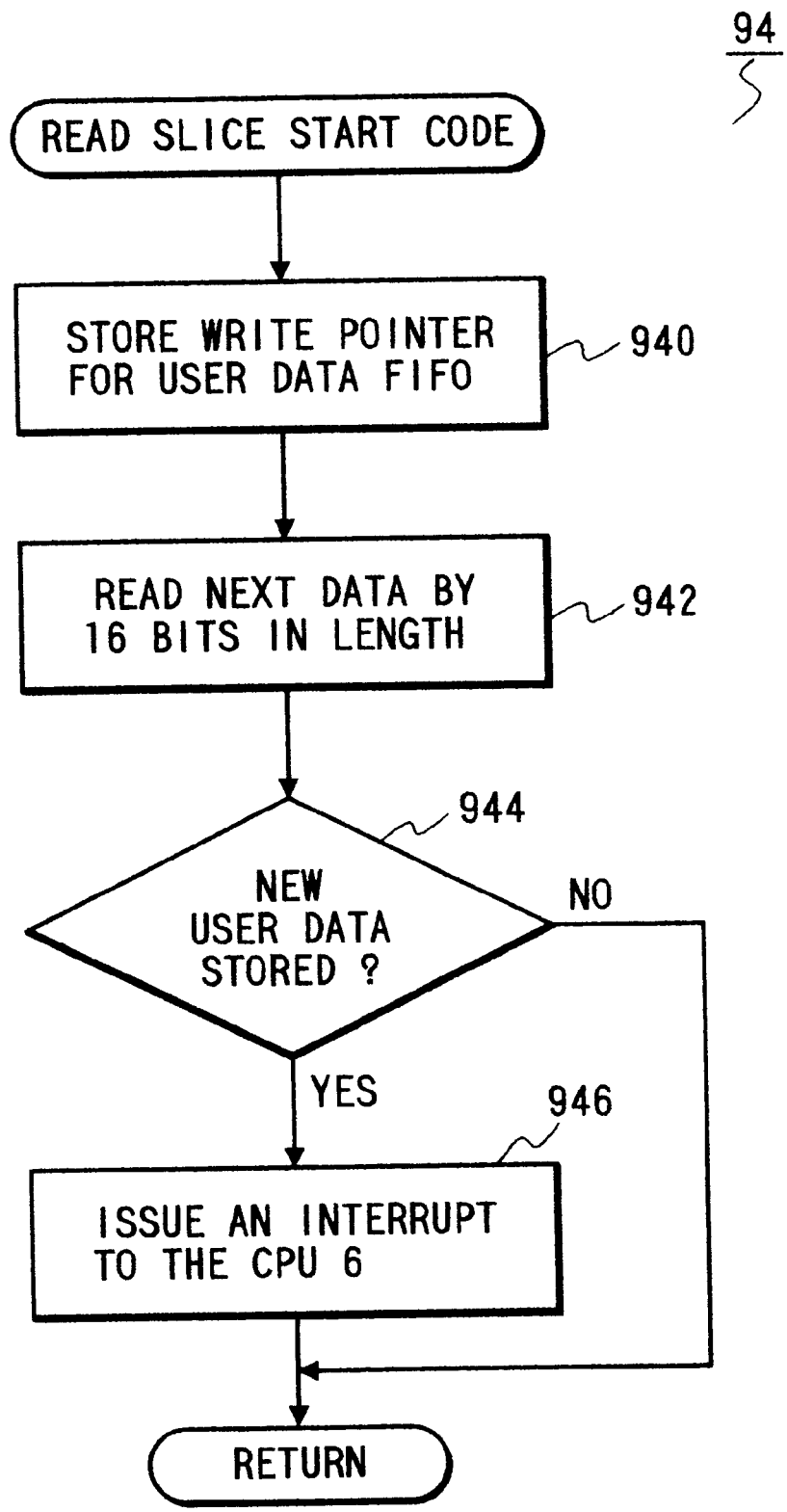

In the READ SLICE START CODE subroutine of FIG. 8, the CPU 31 stores the write pointer of the user data FIFO in step 940, and reads, in a length of 16 bits, the next user data in step 942. The CPU 31 makes a test to see if new user data has been stored in step 944. If so, the CPU 31 issues an interrupt to the controller 6 via an INT line 40 in step 946, and in either case returns to the main program to enter the CAPTION ROUTINE of FIG. 10.

Figure 9:
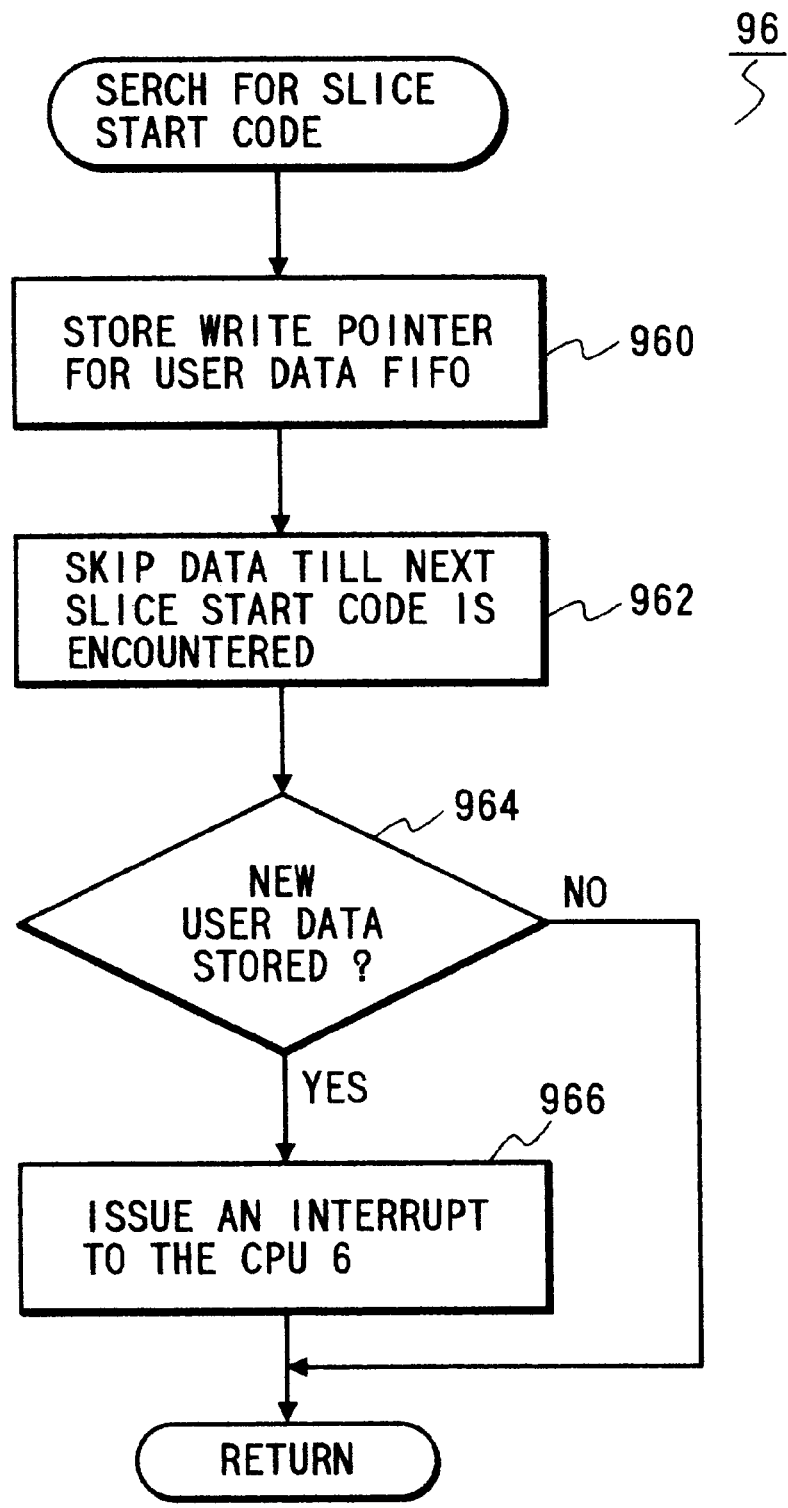

In the REACH FOR SLICE START CODE subroutine of FIG. 9, the CPU 31 stores the write pointer of the user data FIFO in step 960, and in step 962 skips data till the next Slice Start Code is encountered. The CPU 31 makes a test to see if new user data has been stored in step 964. If so, the CPU 31 issues an interrupt to the controller 6 via an INT line 40 in step 964, and in either case returns to the main program to enter the CAPTION ROUTINE of FIG. 10.

Figure 10:
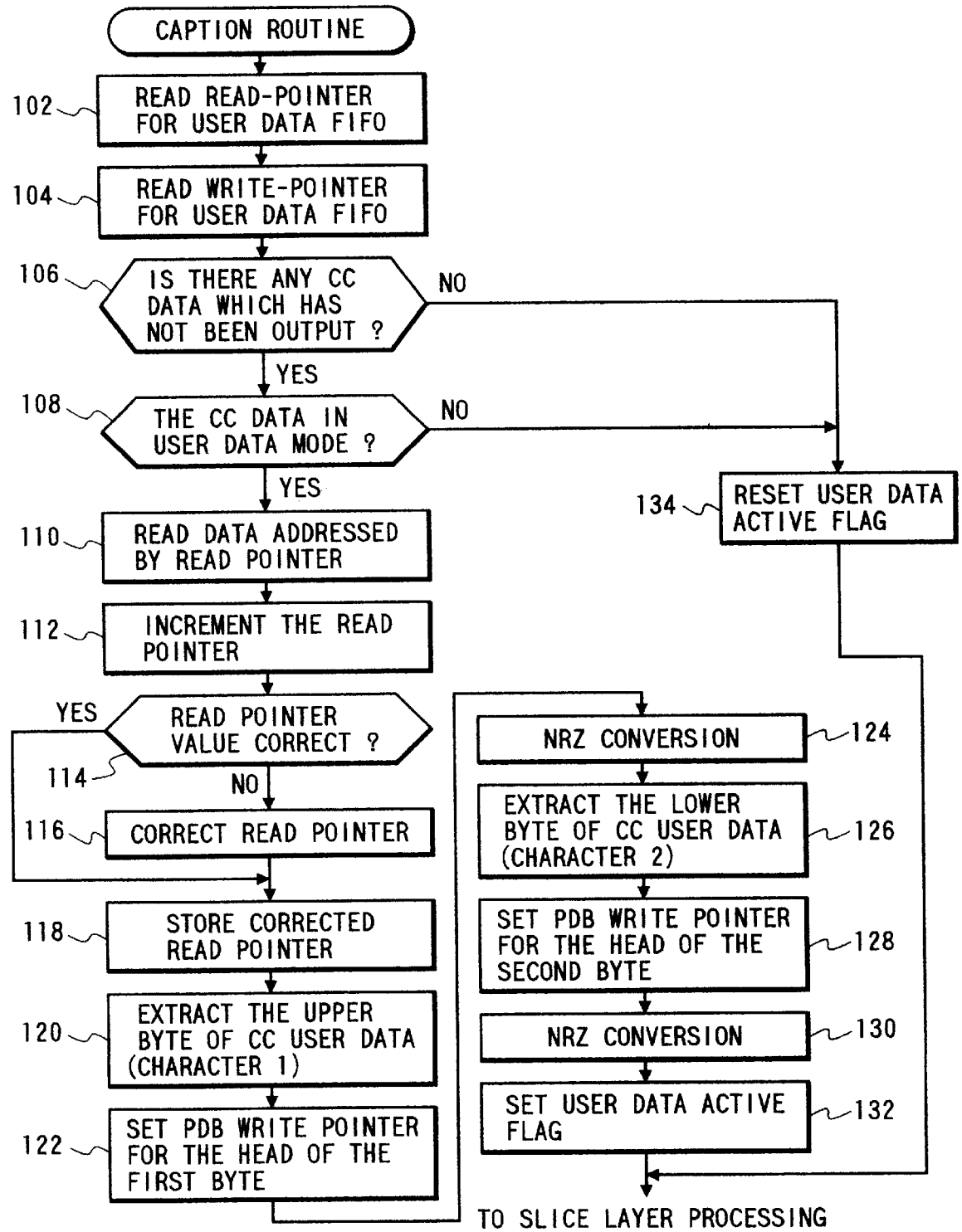
FIG. 10 is a flow chart showing a caption routine executed following the user data routine.

FIG. 10 is a flow chart showing the CAPTION ROUTINE executed following the user data routine of FIG. 5. In FIG. 10, the CPU 31 reads the read and write pointers for the user data FIFO in steps 102 and 104, respectively. Then, the CPU 31 makes a test in step 106 to see if there is any CC data which has not been output and, if so, makes another test in step 108 to see if the CC data is in the user data mode. If so, the CPU 31 reads data pointed by the read pointer (CC User Data field) in step 110, increments the read pointer in step 112, and checks the read pointer value to see if it is correct in step 114. If not, the value of the read pointer is corrected in step 116. Otherwise or after step 116, the CPU 31 stores the corrected read pointer value in step 118, extracts the upper byte of the CC User Data (character 1) in step 120, sets the write pointer of the pixel data buffer (PDB) for the head of the first byte in step 122, and executes an NRZ conversion in step 124. Then the CPU 31 extracts the lower byte of the CC User Data (character 2) in step 126, sets the PDB write pointer for the head of the second byte in step 128, and executes an NRZ conversion in step 130. The CPU 31 sets the user data active flag in step 132, and enters a Slice Layer processing. If the test result is NO in step 106 or 108, then the CPU 31 resets (makes 0) the user data active flag in step 134 and enters a Slice Layer processing.

Figure 11:
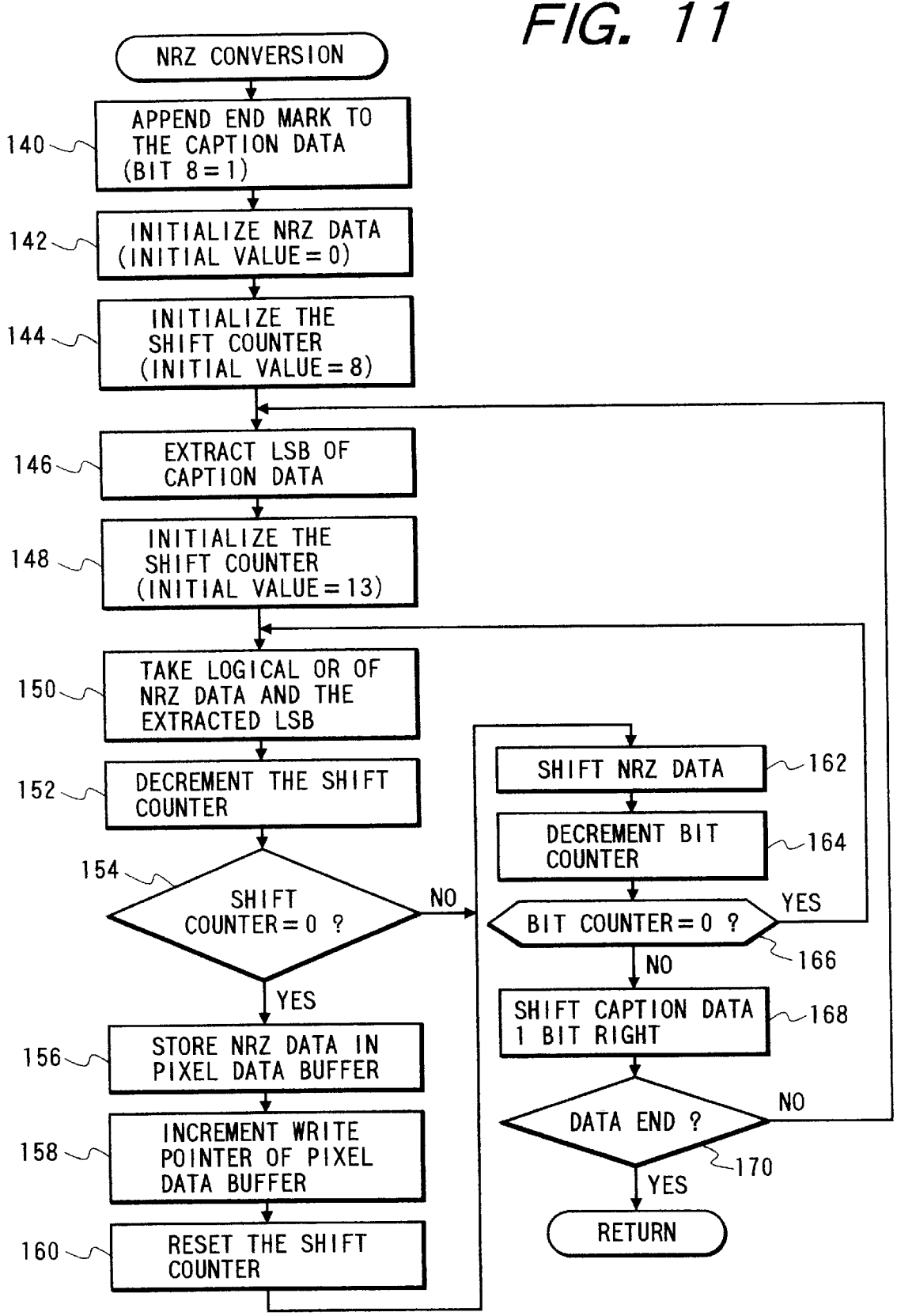
FIG. 11 is a flow chart showing details of the NRZ conversion subroutine of FIG. 10.

In the NRZ conversion subroutine of FIG. 11, the CPU 31 first appends an end mark to the CC data by setting the LSB (least significant bit) of the CC data for 1 in step 140, initializes the NRZ data with an initial value of 0 in step 142, initializes a shift counter with an initial value of 8 in step 144, takes out the LSB of the CC data, (bit data), in step 146, initializes a shift counter with an initial value of 13 in step 148, takes a logical OR of the NRZ data and the bit data in step 150, decrements the shift counter in step 152, and makes a test to see if the shift counter=0 in step 154. If so, then the CPU 31 stores the NRZ data in the pixel data buffer in step 156, increments the write pointer of the pixel data buffer in step 158, resets the shift counter in step 160, and proceeds to step 162. Also, if the test result is NO in step 154, then the control is passed to step 162. In step 162, the CPU 31 shifts the NRZ data, and decrements the bit counter in step 164 to make a test to see if the bit counter become 0 in step 166. If so, the control is returned to step 150, and otherwise the CPU 31 shifts the CC data 1 bit right in step 168. The CC data is checked in step 170 to see if the CC data is exhausted. If so, the CPU 31 returns to the caption routine, and otherwise returns to step 146.

Figure 12:
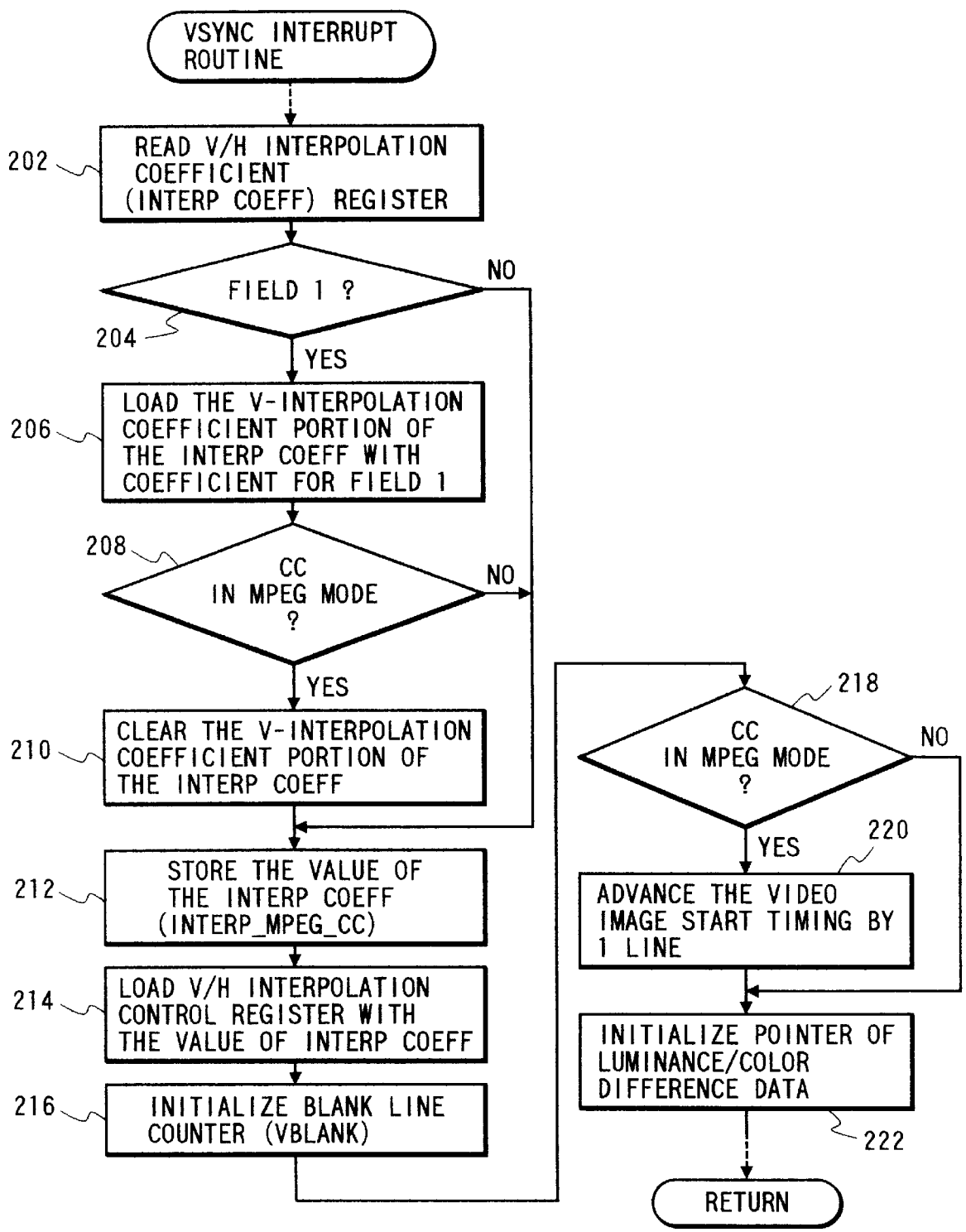
FIGS. 12 and 13 are flow charts showing parts of a vertical and horizontal sync routines, respectively, which accords with the principles of the invention.
Figure 13:
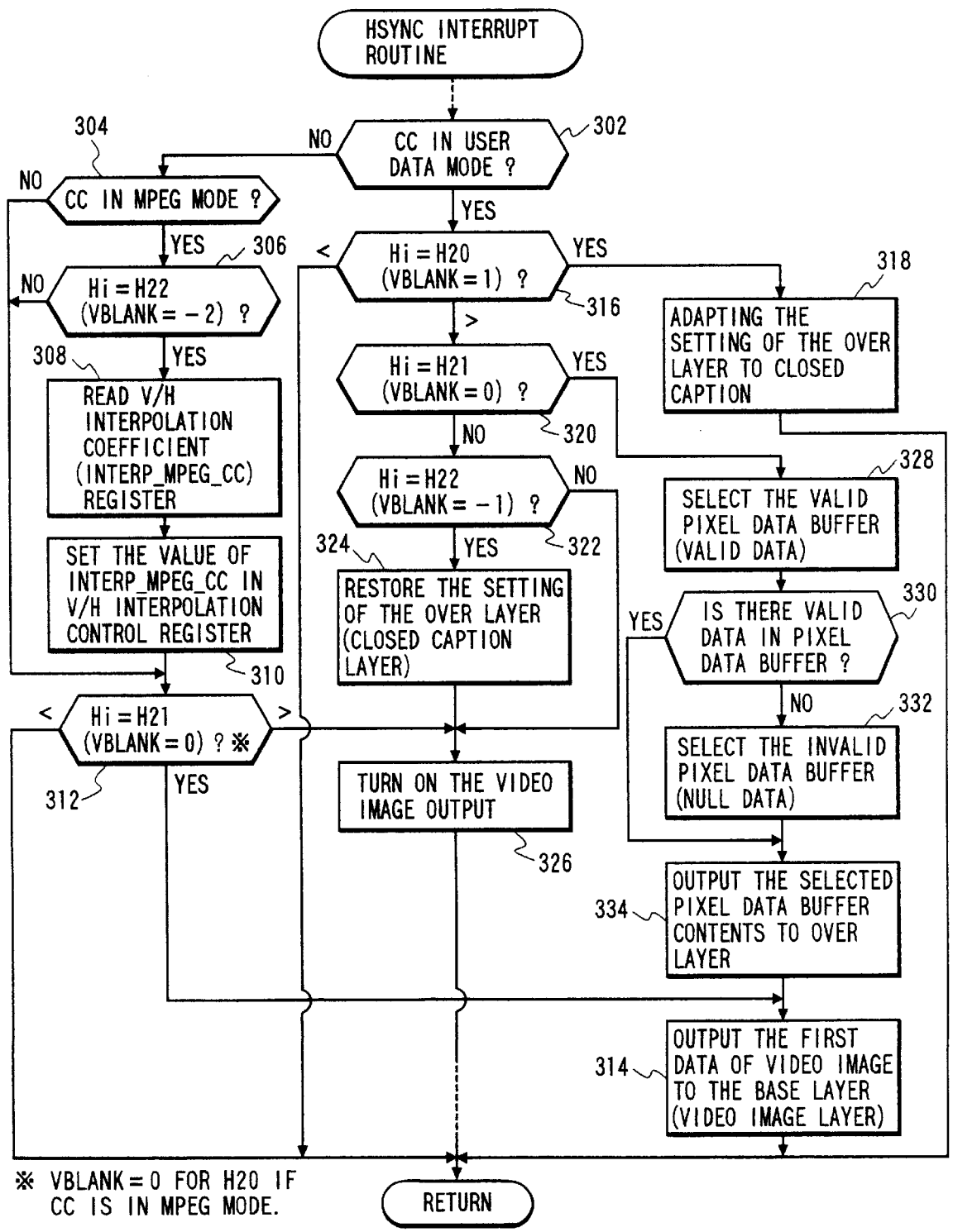

Referring to FIGS. 12 through 13, we will discuss the process of providing video data including a closed caption in the following.

The CPU 31 is interrupted by each vertical sync signal to execute a vertical interrupt subroutine. FIG. 12 is a part of the vertical interrupt subroutine which accords with the principles of the invention. In FIG. 12, the CPU 31 first reads the contents of the vertical/horizontal interpolation coefficient (INTERP COEFF) register in step 202 and see if the current field is a first field in step 204. If so, the CPU 31 changes the vertical interpolation coefficient portion of the INTERP COEFF to coefficients for the first field in step 206. A test is made in step 208 to see if the CC data is in the MPEG mode. If so, the CPU 31 clears the vertical interpolation coefficient portion of the INTERP COEFF in step 210 and proceeds to step 212. Also, if the test result is NO in step 204 or 208, the control is passed to step 212. In step 212, the CPU 31 stores the value of the INTERP COEFF (INTERF_MPEG_CC) in step 212, loads the value of the INTERP COEFF register to a INTERP COEFF control register in step 214, initializes a vertical blank line counter (v-blank) in step 216, and makes a test to see if the CC data is in the MPEG mode in step 218. If so, the CPU 31 advances the video image start timing by 1 line (so as to output the video image at the time of H21) by subtract 1 from the initial value of the v-blank counter in step 220, initializes a pointer of the luminance/color difference data in step 222, and returns after doing some other jobs. If the test result is NO in step 218, the control is passed to step 222.

Figure 14:
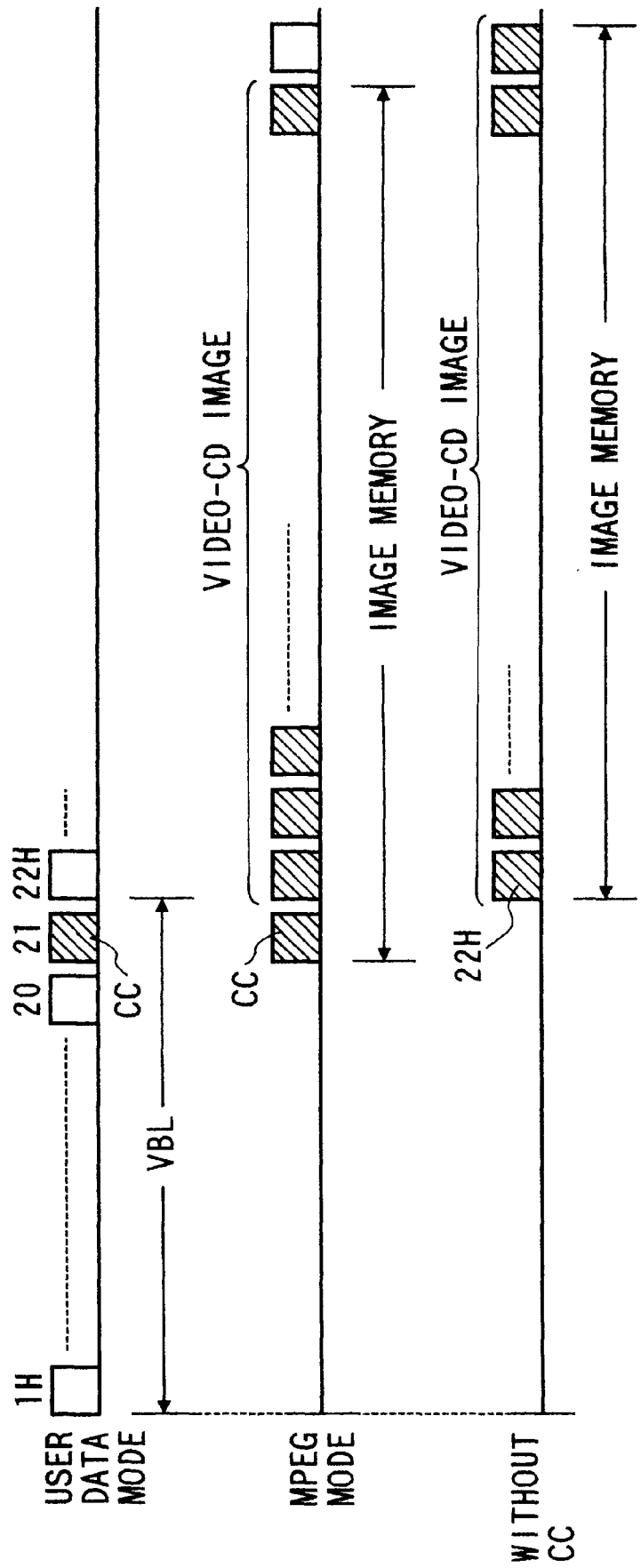
FIG. 14 is a timing chart illustrating the output timing of the closed caption (CC)

The CPU 31 is also interrupted by each horizontal sync signal to execute a horizontal interrupt subroutine. FIG. 13 is a part of the horizontal interrupt subroutine which accords with the principles of the invention. In FIG. 13, if the CC data is neither in the user data mode nor MPEG mode, the CPU 31 proceeds to step 312 via steps 302 and 304. Thereafter, the CPU 31 exits without doing anything from the routine at the time of any of the horizontal scanning lines H1 through H20 (via steps 302, 304 and 312), outputs the first line data of the video image to the video pixel data channel (video image layer) at the line H21 (via step 314), and activates a video image output operation after the lines H22 (via step 328). Thus, in case of no CC data, only the video signal is output during the period after H22 including H22 as shown in WITHOUT CC of FIG. 14.

If the CC data is in the MPEG mode, the CPU 31 proceeds to step 312 when the current line H1 is not H22, and reads the vertical/horizontal (V/H) interpolation coefficient (INTERP_MPEG_CC) register for MPEG mode, sets the V/H interpolation control register for the read value in step 310, and proceeds to the above described step 312. In this case, the closed caption is output during the period of H21, and the video signal is output during the period after H22 including H22 as shown in MPEG MODE of FIG. 14.

If the CC data is in the user data mode or the control is passed to step 316, the CPU 31 simply exits from the routine at the time of any of the lines H1 through H19 (via step 316) and, in case of H20, adapts the setting of the bit map pixel data channel to a closed caption and returns via step 318. In case of any of the lines other than H20 through H22, the CPU 31 proceeds to the above step 326. In case of H22, the CPU 31 restores the setting of the bit map pixel data channel (CC layer) in step 324 and proceeds again to step 326. In case of H21, the control is passed to step 328. In this way, if the CC data is in the user data modes the closed caption is output during H21 as shown USER DATA MODE in FIG. 14.

In step 328, the CPU 31 selects the valid pixel data buffer (valid data), and makes a test in step 330 to see if there is valid data in the pixel data buffer. If not, the CPU 31 selects the invalid pixel data buffer (null data) in step 332, output the selected pixel data buffer contents to the bit map pixel data channel in step 334 and proceeds to the above described step 314. If the test result is YES in step 330, then the CPU 31 proceeds to step 334.

Figure 15:
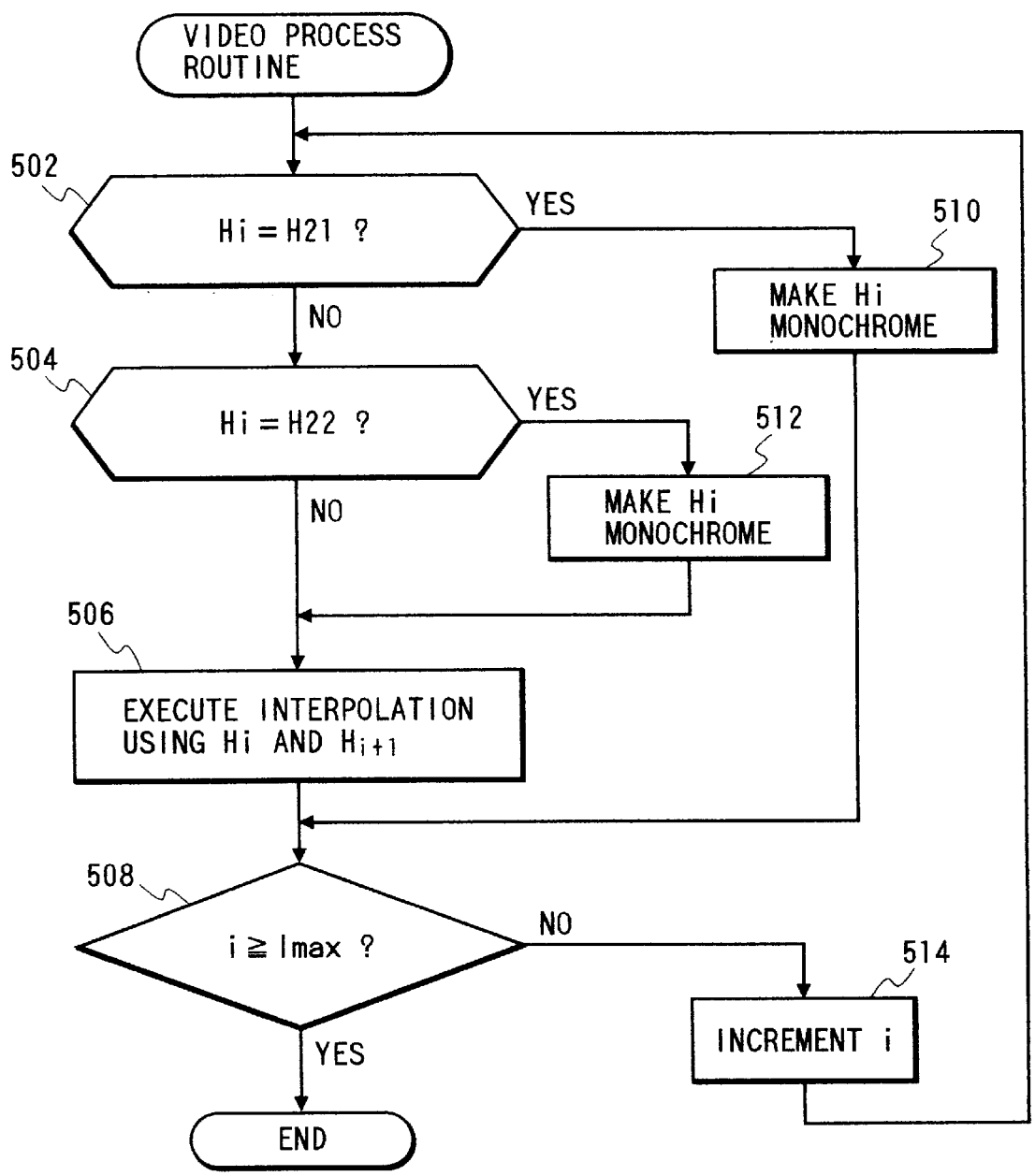
FIG. 15 Is a flow chart showing, as an example of the chrominance processing, a routine for vertical interpolation in accordance with the principles of the invention.

FIG. 15 is a flow chart showing, as an example of the chrominance processing, a routine for vertical interpolation in accordance with the principles of the invention. This routine is excused if it is determined, after the video image output is started in the HSYNC INTERRUPT ROUTINE of FIG. 13, that any CC data exists in the MPEG data stream reproduced from the video-CD. In FIG. 15, the CPU 31 makes a test at step 502 to see if Hi=H21. If so, the line Hi is made monochrome and, via step 508, the routine ends if the line number "1" is not smaller than the possible maximum number, and otherwise "1" is incremented in step 514 and the control is passed to step 502. If the test result in step 502 is NO, the CPU checks Hi to see if it is H22. If not, the CPU 31 performs an interpolation by using Hi and $H_{i+1}$ in step 506 and proceeds to the above mentioned step 508. If the test result is YES in step 504 (in case of H22), the Hi is made monochrome in step 512 and the control is passed to step 506. In case of the interpolation of H22 and H23, through the line H22 is monochrome (the color difference data Cb and Cr are fixed values), this dose not matter for the sight.

Though the decoder 9 has been constituted by discrete elements in the illustrative embodiment, the decoder 9 may be realized as an IC.

It should be noted that though an PMEG decoder has been applied to a video-CD in the above illustrative embodiment, the decoder 9 may be applied to any kind of optical disc players which work according to MPEG1.

It is also noted that an MPEG decoder of the invention is applicable to a receiver in a communication system or a communication network with a relative low transmission rate such as a public telecommunication network.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method, used in an MPEG decoder which receives a data stream including MPEG-coded data which contains closed caption (CC) data in a user data area as character codes (in a user data mode) or in a picture data area as NRZ-converted pixel data (in an MPEG mode) and at least outputting an MPEG-decoded video data stream, for inserting the CC data in the scanning line H21, the method comprising the steps of:

storing MPEG-decoded video data in said MPEG-decoded video data stream in a first memory area for storing a frame of video data read by a horizontal scanning line of data for each horizontal scanning period;

in response to a determination that said CC data is in said user data mode, executing the following steps of:

converting said CC data in said user data area into NRZ-converted CC data;

storing said NRZ-converted CC data in a second memory area;

in a period of a horizontal scanning line H21 (hereinafter, referred to simply as "H21"), outputting said NRZ-converted CC data from said second memory area to a bit map pixel data channel of a video output processor;

in each of the horizontal scanning periods after H21, outputting the contents of the next line of said first memory area to a video pixel data channel of said video output processor, and in response to a determination that said CC data is in said MPEG mode executing the following steps of:

in a period of said line H21 outputting the contents of the first line of said first memory area;

in each of the horizontal scanning periods after H21, outputting the contents of the next line of said first memory area; and excluding at least said line H21 from vertical interpolation target.

2. A method, used in an MPEG decoder which receives a data stream including MPEG-coded data which contains closed caption (CC) data in picture data as NRZ-converted pixel data (in an MPEG mode) and at least outputting an MPEG-decoded video data stream, for inserting the CC data in the scanning line H21, the method comprising the steps of:

storing MPEG-decoded video data in said MPEG-decoded video data stream in a first memory area for storing a frame of video data which is to be read by a horizontal scanning line of data at a time; and in response to a determination that the current frame contains said CC data in said MPEG mode, executing the following steps of:

in a period of said line H21, outputting the contents of the first line of said first memory area;

in each of the horizontal scanning periods after H21, outputting the contents of the next line of said first memory area; and excluding at least said line H21 from vertical interpolation target.

3. A method as defined in claim 2, wherein said step of excluding at least said line H21 comprises the step, started by each of vertical sync signals, of clearing vertical interpolation coefficients for a first field.

4. A method as defined in claim 2, wherein said step of excluding at least said line H21 comprises the step, executed in case when it is found in a horizontal sync interrupt routine that the current frame has said CC data of said MPEG mode, of making the lines H21 and H22 monochrome.

5. A system, used in an MPEG decoder which receives a data stream including MPEG-coded data which contains closed caption (CC) data in a user data area as character codes (in a user data mode) or in picture data as NRZ-converted pixel data (in an MPEG mode) and at least outputting MPEG-decoded video data, for inserting the CC data in the scanning line H21, the system comprising:

first memory means for storing a frame of said MPEG-decoded video data which is to be read by a horizontal scanning line of data at a time;

means for converting said CC data in said user data area into NRZ-converted CC data;

second memory means for storing said NRZ-converted CC data;

means for outputting said NRZ-converted CC data from said second memory area to a bit map pixel data channel in a period of a horizontal scanning line H21 (hereinafter, referred to simply as "line H21");

means operative in said user data mode for outputting the contents of the next line of said first memory means to a video pixel data channel in each of the horizontal scanning periods after H21;

means operative in said MPEG mode for outputting the contents of the first line of said first memory means in a period of said line H21;

means operative in said MPEG mode for outputting the contents of the next line of said first memory means in each of the horizontal scanning periods after H21; and means operative in said MPEG mode for excluding at least said line H21 from vertical interpolation target.

6. A system as defined in claim 5, wherein all said means other than said first and said second memory means are realized as a single integrated circuit (IC).

7. A system as defined in claim 5, wherein all said means other than said first and said second memory means are incorporated in said MPEG decoder.

8. A system, operating with an MPEG decoder which receives a data stream including MPEG-coded data which contains closed caption (CC) data in picture data as NRZ-converted pixel data (in an MPEG mode) and at least outputting MPEG-decoded video data, for inserting the CC data in the scanning line H21, the system comprising:

memory means for storing a frame of said MPEG-decoded video data in a first memory area which is to be read by a horizontal scanning line of data at a time;

means operative in said MPEG mode for outputting the contents of the first line of said first memory area in a period of said line H21;

means operative in said MPEG mode for outputting the contents of the next line of said first memory area in each of the horizontal scanning periods after H21; and means operative in said MPEG mode for excluding at least said line H21 from vertical interpolation target.

9. A system as defined in claim 8, wherein said means for excluding at least said line H21 comprises:

means activated by each of vertical sync signals for clearing vertical interpolation coefficients for a first field of a picture.

10. A system as defined in claim 8, wherein said means for excluding at least said line H21 comprises:

means, activated in case when it is found in a horizontal sync interrupt routine that the current frame has said CC data of said MPEG mode, for making the lines H21 and H22 monochrome.

11. A system for receiving a data stream including MPEG-coded data which contains CC data in a user data or MPEG mode and at least outputting an MPEG-decoded video data stream which contains the CC data in the scanning line H21 in a form of NRZ-converted pixel data, the system being connected to a RAM having at least a first memory area for storing a frame of video data which is to be read by a horizontal scanning line of data at a time and a second memory area, the system comprising:

means for accessing said RAM;

means for receiving said data stream from the outside;

control means for MPEG-decoding said MPEG-coded data in said data stream, storing MPEG-decoded video data in said first area through said RAM accessing means and extracting said CC data in said user data area; and means having a video pixel data channel and a bit map pixel data channel for combining a first data stream received via said video pixel data channel and a second data stream received via said bit map pixel data channel Into a single data stream; said control means comprising:

means for converting said extracted CC data and storing NRZ-converted CC data in said second memory area through said RAM access means;

means for outputting said NRZ-converted CC data from said second memory area to said bit map pixel data channel in a period of a horizontal scanning line H21 (hereinafter, referred to simply as "line H21"); and means operative in said user data mode for outputting the contents of the next line of said first memory means to a video pixel data channel in each of the horizontal scanning periods after H21.

12. A system as defined in claim 11, wherein said control means further comprises:

means operative in said MPEG mode for outputting the contents of the first line of said first memory means in a period of said line H21; and means operative in said MPEG mode for outputting the contents of the next line of said first memory means in each of the horizontal scanning periods after H21.

13. A system as defined in claim 12, wherein said control means further comprises means operative in said MPEG mode for excluding at least said line H21 from vertical interpolation target.

14. A system as defined in claim 13, wherein said means for excluding at least said line H21 comprises:

means activated by each of vertical sync signals for clearing vertical interpolation coefficients for a first field of a picture.

15. A system as defined in claim 13, wherein said means for excluding at least said line H21 comprises:

means, activated in case when it is found in a horizontal sync interrupt routine that the current frame has said CC data of said MPEG mode, for making the lines H21 and H22 monochrome.

16. A system as defined in claim 11, wherein means for receiving said data stream from the outside and control means are realized as a single integrated circuit (IC).

17. A video-CD player capable of inserting CC data contained in a user data mode or am MPEG mode as NRZ-converted pixel data in an MPEG-coded data recorded on a video-CD into the scanning line H21 of a video signal reproduced from the video-CD; the video-CD player comprising:

means for playing said video-CD and providing an MPEG-coded data stream;

means for MPEG decoding said MPEG-coded data stream and providing a video data and said CC data;

first memory means for storing a frame of said video data which is to be read by a horizontal scanning line of data at a time;

means for NRZ-converting said CC data into NRZ-converted CC data;

second memory means for storing said NRZ-converted CC data;

means having a video pixel data channel and a bit map pixel data channel for combining a first data stream received via said video pixel data channel and a second data stream received via said bit map pixel data channel into a single data stream;

means for outputting said NRZ-converted CC data from said second memory area to said bit map pixel data channel in a period of a horizontal scanning line H21; and means operative in said user data mode for outputting the contents of the next line of said first memory means to said video pixel data channel in each of the horizontal scanning periods after H21.

18. A video-CD player as defined in claim 17, further comprising:

means operative in said MPEG mode for outputting the contents of the first line of said first memory means in a period of said line H21; and means operative in said MPEG mode for outputting the contents of the next line of said first memory means in each of the horizontal scanning periods after H21.

19. A system as defined in claim 18, further comprising means operative in said MPEG mode for excluding at least said line H21 from vertical interpolation target.

20. A system as defined In claim 19, wherein said means for excluding at least said line H21 comprises:

means activated by each of vertical sync signals for clearing vertical interpolation coefficients for a first field of a picture.

21. A system as defined in claim 19 wherein said means for excluding at least said line H21 comprises:

means, activated in case when it is found in a horizontal sync interrupt routine that the current frame has said CC data of said MPEG mode, for making the lines H21 and H22 monochrome.

* * * * *